United States Patent
Bireley et al.

(10) Patent No.: US 8,086,817 B2
(45) Date of Patent: Dec. 27, 2011

(54) METHOD AND SYSTEM FOR EFFICIENT RETRIEVAL OF DATA OF LARGE OR UNKNOWN LENGTH BY A NATIVE APPLICATION PROGRAM

(75) Inventors: William Robert Bireley, Morgan Hill, CA (US); Margaret Ann Dong, San Jose, CA (US); Kelvin Ho, Richmond Hill (CA); Sigitas Bigelis, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 11/614,662

(22) Filed: Dec. 21, 2006

(65) Prior Publication Data
US 2008/0155221 A1     Jun. 26, 2008

(51) Int. Cl.
    *G06F 12/10*    (2006.01)
(52) U.S. Cl. ..................................... 711/171
(58) Field of Classification Search .......... None
    See application file for complete search history.

(56) References Cited

U.S. PATENT DOCUMENTS

| | | | |
|---|---|---|---|
| 5,964,869 A | 10/1999 | Talcott et al. | |
| 5,974,418 A * | 10/1999 | Blinn et al. | 707/741 |
| 6,061,763 A * | 5/2000 | Rubin et al. | 711/129 |
| 6,643,637 B2 | 11/2003 | Chen et al. | |
| 6,643,755 B2 | 11/2003 | Goodhue et al. | |
| 6,754,653 B2 | 6/2004 | Bonner et al. | |
| 6,938,126 B2 | 8/2005 | Ramirez et al. | |
| 7,305,387 B2 * | 12/2007 | Poyourow | 1/1 |
| 2002/0035676 A1 * | 3/2002 | Weeks | 711/170 |
| 2002/0143728 A1 * | 10/2002 | Cotner et al. | 707/1 |
| 2004/0107335 A1 | 6/2004 | Dua et al. | |
| 2004/0167879 A1 * | 8/2004 | Cotner et al. | 707/3 |
| 2004/0230776 A1 | 11/2004 | Check et al. | |
| 2005/0187893 A1 | 8/2005 | Ashwin et al. | |
| 2005/0289160 A1 | 12/2005 | Ashwin et al. | |
| 2007/0101091 A1 * | 5/2007 | Kaakani et al. | 711/170 |

OTHER PUBLICATIONS

Wallace, Steven et al., "Modeled and Measured Instruction Fetching Performance for Superscalar Microprocessors," IEEE Transactions on Parallel and Distributed Systems, vol. 9, No. 6, Jun. 1998, pp. 570-578.
More, Sachin, et al., "Extended Collective I/O for Efficient Retrieval of Large Objects," Proceedings of the Fifth International Conference on High Performance Computing, Dec. 1998, 8 pages.

* cited by examiner

*Primary Examiner* — Duc Doan
(74) *Attorney, Agent, or Firm* — Sughrue Mion, PLLC

(57) ABSTRACT

A method and system for efficient allocation of memory in database retrieval employs a technique which allocates a memory portion of a first size which may or may not be smaller than a data item to be retrieved from the database (such as a column which may be of indeterminate length). In that circumstance, a first FETCH, for example, an SQL FETCH, is followed by a new syntactical instruction, a FETCH CONTINUE, until all of the data item is retrieved. The FETCH CONTINUE may involve allocating memory portions of similar or different sizes to accommodate additional fetched portions, and may involve varying numbers of fetches.

22 Claims, 4 Drawing Sheets

METHOD AND SYSTEM FOR EFFICIENT RETRIEVAL OF DATA OF LARGE OR UNKNOWN LENGTH BY A NATIVE APPLICATION PROGRAM

BACKGROUND OF THE INVENTION

The present invention relates to database information retrieval, and in particular to a method and system for improving storage efficiency in retrieving data in database operations.

Software applications that retrieve data from a relational database into a computer system may specify a Structured Query Language (SQL) statement, such as a SELECT statement, specifying the data to be retrieved, and may associate that statement with a "cursor" object. The application then may perform an OPEN operation against the cursor, and a FETCH operation to retrieve each "row" of data. Prior to executing the FETCH, the application may allocate an area in the computer system's memory in which to retrieve the data. This allocation requires that the application know the size of the data before performing the FETCH. This kind of solution is primarily for "native" application programs that execute on the same computer where the database application is running.

Each row of data consists of one or more "columns" of data, each with a pre-defined "data type". In one approach the application can use the total length of all of the columns to determine how large an area of memory is needed. For most data types, this length can be acquired from the database, or it can be inferred from the type. Some standard relational data types allow insertion of variable length. When the table and columns are defined to the relational database, a maximum length n is specified for the columns When data is inserted into the table, the actual data provided for these columns can have a length anywhere from 0 to n characters or bytes. For example, one standard data type in relational databases is known as VARYING CHARACTER. This data type typically allows for data up to 32767 bytes in length. However, often there is less, sometimes much less actual data stored in the column for most rows. For a column definition with a size in this range, applications typically just allocate the maximum size for the column, even though there may be less, or much less actual data. As a result, a certain amount of allocated storage will remain unused. In some cases, but not all, such a level of unused storage may be acceptable.

Many relational database implementations support a data type known as a "Large Object" or LOB. Two types of LOBs include a Character LOB (CLOB) type and a Binary LOB (BLOB) type. Similarly to the VARYING CHARACTER type described earlier, the LOB data types allow for variable sizes of data, with a defined maximum. The allowable range for these LOB datatypes is frequently up to 2 Gigabytes (greater than 2 billion bytes). As often is the case with the VARYING CHARACTER type, there can be less, sometimes much less actual data inserted into a LOB column than the maximum allowed.

The reason for over-allocation of storage space has been straightforward, but not necessarily problematic when individual allocations are not too substantial. For example, a database administrator that is defining the table characteristics for a new database table often does not know how much data will be inserted over the life of the table. Consequently, the administrator might choose a maximum size for a LOB column such as 10 MB. However, in practice, the actual amount of data stored in a given column might be less than 100 kb, or 1/100th of this maximum.

For an application that needs to FETCH the data, allocating 10 MB of storage might be prohibitive, particularly if it is necessary to access several of these large columns, or if there are multiple concurrent application processes running in that system, vying for a limited amount of computer memory.

This problem is further compounded by a data type that has become a feature in relational database implementations—XML, or eXtended Markup Language, data type. One standard for this data type defines it as a variant of a LOB, but with no defined maximum length. As a result, even for an application that is able to allocate the maximum length for the memory area, that maximum value is not known before the FETCH occurs.

Some applications have attempted to solve this problem of not knowing the maximum value by guessing at a practical maximum length for buffer size allocation. However, if the guess is too low, many relational database implementations will not provide the actual data length back to the application.

One solution to this problem is to use a "LOB locator" for discovering the actual storage size of the data and for allocating only the necessary amount of storage. A LOB locator provides a way to acquire a "handle" on the LOB value and then manipulate the value via that handle. For example, rather than fetching a LOB directly into an allocated memory area, the application program may fetch a LOB locator that references the LOB data value. The data remains in the database until requested by the application via the locator. The application can then use the locator to find out the size of the LOB value.

This approach has the following drawbacks. A first drawback is performance, because it is necessary to make three requests to the database in order to have only the required amount of memory allocated for the buffer: The initial FETCH request to retrieve the LOB locator; a request to find out how large the LOB value is; and another FETCH to retrieve the LOB data, after allocating the necessary size buffer.

The cost of transferring control to the database three times, rather than just once, can be costly. Additionally, if there is more than one LOB value in the result set of the initial fetch, each additional LOB value will require two more trips to the database (a request to find out the size, and a fetch to retrieve the data)

A second drawback to the "LOB locator" approach is resource consumption within the database to manage the LOB locators. Frequently, applications will scan through many thousands or millions or rows of data. If the database must keep track of each locator that was passed to the application, managing these locators can consume a lot of memory very quickly.

The very use of XML objects can introduce a further complication, when implementers of XML decide not to provide for locator capability on these XML objects in recognition of LOB locator limitations.

In view of the foregoing, it would be desirable to have a method and system to allow retrieval of large objects without using locators and without requiring maximum storage allocation.

BRIEF DESCRIPTION OF THE DRAWINGS

Embodiments of the present invention now will be described herein with reference to the accompanying drawings, similar reference numbers being used to indicate functionally similar elements.

DESCRIPTION OF EMBODIMENTS

Figure 1:
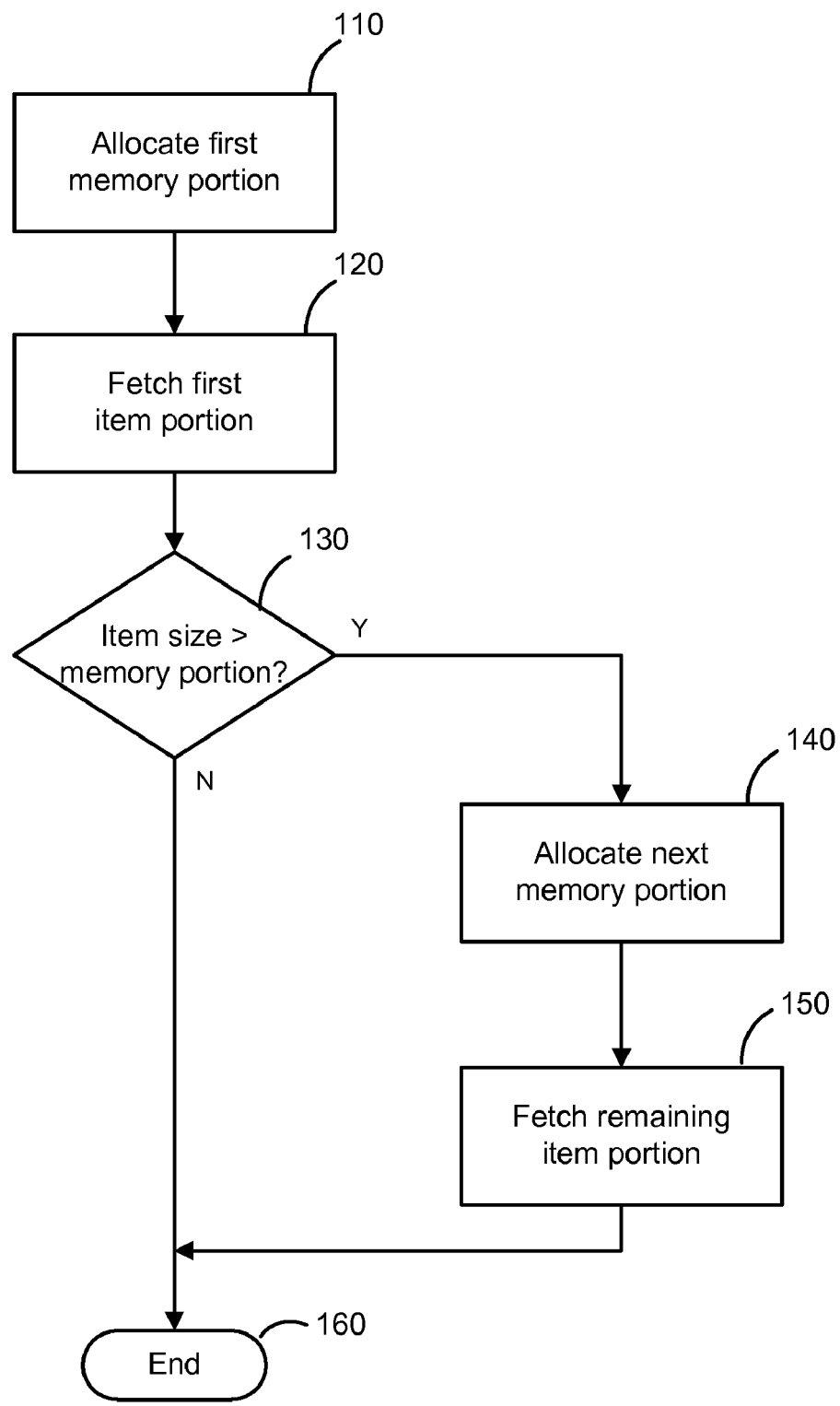
FIG. 1 is a flow chart depicting a sequence of operation for fetching a database item of indeterminate size according to one embodiment of the invention.

In one embodiment, the present invention introduces extensions to database language statements, in one instance, to the SQL FETCH statement, to allow an application to retrieve data for columns defined as LOB or XML data types into a buffer or other suitable memory area of a relatively small or moderate size. If the memory area turns out not to be large enough, the application can then effectively do another fetch, in one embodiment, a "continued" FETCH, for the remaining data value(s), which may be truncated after the allocated memory area initially is filled.

In one embodiment, the database may provide the actual length value of the truncated data objects, so that the application then can allocate the appropriate size of memory to hold the remainder of the data and then request a "FETCH CONTINUE" operation to retrieve the rest of that data. For example, to retrieve a 100 kilobyte LOB, the application might use a 10 kb memory area and perform one FETCH CONTINUE operation to retrieve the other 90 kb after allocating a 90 kb space.

In another embodiment, the application can continue to retrieve the remaining data in small pieces. Referring to the preceding example, the application may perform nine FETCH CONTINUE operations to retrieve the entire LOB value (10 kb being retrieved in the initial FETCH, and the other 90 kb being retrieved in the nine FETCH CONTINUE operations).

In a further embodiment, the application may combine these two approaches in some fashion, to limit the number of FETCH CONTINUE operations, or to limit the size of the memory to be re-allocated after the FETCH. Looking again at the 100 kb example, the application may perform five FETCH CONTINUE operations, retrieving a further 10 kb in each of the first four FETCH CONTINUE operations, and the remaining 50 kb in the last FETCH CONTINUE.

As a still further alternative, the application may perform a predetermined or variable number of FETCH CONTINUE operations, increasing or otherwise varying the allocated space one or more times until all of the data has been fetched. Looking once more at the 100 kb example, the application may perform three FETCH CONTINUE operations, retrieving 20 kb in the first, 30 kb in the second, and 40 kb in the third. Of course, the sequence need not be increasing, though this approach may be practical.

The inventive approach, in its various forms and embodiments, enables reduced storage allocation when retrieving what may be a large object of unknown length. Additionally, in one embodiment, when using a moderately sized memory area, data may be retrieved in one request to the database, assuming that a moderately sized memory buffer is used. Further, the inventive approach does not depend on LOB locators with the associated management issues.

In accordance with one or more aspects of the present invention, the following functional enhancements may allow for efficient fetching of LOB and XML columns of large or unknown length. First, a syntax extension may be added to the SQL FETCH statement that allows an application program to request that the database enable subsequent "CONTINUE" operations if one or more of the columns is truncated. In order for this to happen, the database should not discard the remainder of any truncated LOB or XML columns. Instead, the database should maintain a current position within the LOB or XML value at the point of truncation. Any subsequent FETCH CONTINUE requests then would resume from that position. In addition, the database should return a length value for each truncated LOB or XML column indicating the actual total length of the item.

A second functional enhancement may include a new clause for the FETCH statement. I one embodiment, this clause is called CURRENT CONTINUE. A FETCH statement with the CURRENT CONTINUE clause may assign the next piece of data for LOB and XML columns of the current row to the corresponding host variables. This clause would provide an interface for the application efficiently to get the remaining data for any truncated LOB or XML column in the result set. The CURRENT keyword is an existing standard syntax which indicates that the database should remain on the current row.

There are several ways to use FETCH CURRENT CONTINUE effectively for large LOBs or XML objects. One is dynamic allocation. In this approach, the initial FETCH would fetch data into a preallocated buffer or other storage area of a moderate size. If the returned data item is too large to fit in that storage area, the application can use the length information that the database returns by the database to allocate the proper amount of storage, enabling the use of one FETCH CONTINUE statement to retrieve the remainder of the data. To implement this method, it may be desired that the programming language allow dynamic storage allocation. It also may be desired that the application build and manage its own DESCRIPTOR area (SQLDA) for fetching from the cursor and use the form of the FETCH and FETCH CURRENT CONTINUE statements with the INTO DESCRIPTOR: SQLDA clause. This approach is a common programming technique in dynamic SQL programs. "Pseudo-code Example 1" below provides a further description of one form of processing.

As alluded to above, there are variants on dynamic allocation, in which the storage area may be varied in size by less than the full amount necessary to retrieve the remaining data.

A second way of using FETCH CURRENT CONTINUE instructions is to stream the data through a single fixed-size buffer. In this approach, after the original FETCH, if there is more data remaining, the application would use as many subsequent FETCH CONTINUE statements as necessary to consume the data, using the originally-allocated buffer area. This approach assumes that the data in the buffer is processed after each FETCH or FETCH CONTINUE operation. For example, the data may be written to a file, or piped to another tool. "Pseudo-code Example 2" below provides a further description of this form of processing.

Pseudo-Code Example 1

This example uses dynamic SQL and manipulation of a descriptor area (SQLDA) by the application. In one version of this example, the application will use at most two fetch operations to retrieve the LOB and XML values. On the first fetch operation, it fetches these columns into a moderately-sized buffer. In cases where that buffer is not large enough, it receives accurate length information from the database so it can then allocate the appropriate amount of storage and then retrieve the remaining, unreturned data for the truncated columns. This version of the example is shown in the following pseudocode and description, in which, if a table was created as follows:

Create Table T1 (C1 INT, C2 CLOB(100M), C3 CLOB(32K), C4 XML)

And this table T1 has a row in which:
C1 contains a valid integer, C2 contains 10 MB of data, C3 contains 32 K, and C4 contains 1 MB
The pseudo-code then might appear as follows:

```
[1] EXEC SQL DECLARE CURSOR1 CURSOR FOR DYNSQLSTMT1;
EXEC SQL PREPARE DYNSQLSTMT1 FROM 'SELECT * FROM T1';
[2] EXEC SQL DESCRIBE DYNSQLSTMT1 INTO DESCRIPTOR :SQLDA;
[3] EXEC SQL OPEN CURSOR1;
[4] Prepare for FETCH:
    Allocate data buffers (32K for each CLOB, XML item)
    Set data pointers and lengths in SQLDA.
[5] EXEC SQL FETCH WITH CONTINUE CURSOR1 INTO DESCRIPTOR :SQLDA;
[6] if a row was found and truncation occurred on any LOB or XML column
    loop through each column
        if column is LOB or XML and was truncated
            allocate larger buffer area for any truncated columns, move first piece to
the larger area
            reset data pointers, length fields in SQLDA
        endif
    endloop
    [7] EXEC SQL FETCH CURRENT CONTINUE CURSOR1 INTO
DESCRIPTOR :SQLDA;
    endif
```

Work with returned data

The description of this pseudo-code example is as follows:

[1] The application declares a cursor for a dynamic SQL statement, and then prepares a SELECT statement which will retrieve LOB and XML columns of different sizes.

[2] The application DESCRIBEs the statement. This populates the SQLDA with initial data type and length information.

[3] The application opens the cursor.

[4] The application prepares for the FETCH by allocating storage to receive each of the output columns. For the LOB and XML columns it allocates 32767 bytes. This value is arbitrary, and could be larger or smaller as desired. This example assumes that the programming language being used allows for dynamic storage allocation. The application then completes the data descriptor (SQLDA) setup in preparation for the FETCH. It sets the pointers in the structure to point at each allocated buffer area and sets the length variable to show that these buffers are 32767 bytes in length.

[5] The application issues the FETCH request using the WITH CONTINUE clause to indicate that the database should manage LOB and XML truncation on output differently, as described below. After the FETCH is complete, the buffers contain complete data for C1 (the integer) and C3 (it fits in the 32K buffer). Since the data of C2 and C4 are greater than 32 KB, these two columns are truncated. The FETCH returns a truncation warning. When this truncation occurs, the database may behave as follows:

The amount of data written to the data buffer equals the size of the buffer provided (the application passes the length in the descriptor). The remaining data remains materialized (cached) in the relational database, and it can be retrieved by the application using FETCH CURRENT CONTINUE following the current FETCH. If the data contains multi-byte character data, a partial character may result at the truncation point because the data is truncated on a byte boundary.

Normally the database writes a length value to a memory location that the database specifies. In the case of truncation, the database normally would write the value corresponding to the amount of data that it had written, which is essentially the buffer size. If FETCH WITH CONTINUE was specified, then the database instead would report the actual length of the entire data value. This lets the application know how large the actual data element is and how large a buffer would be needed to hold it all.

[6] The application checks the result of the FETCH and processes the returned data. If any data has been truncated, the database passes back a truncation warning. In this example, truncation has occurred, so the application detects that and loops through each output column to find the truncated columns. For the LOB and XML columns, it does this by comparing the returned length value with the length of the provided buffer. If the returned value is greater than the buffer length, truncation has occurred. The application then uses the returned length value to allocate a new buffer. It then copies the first piece of data into the new buffer and resets the buffer pointer that it will provide to the database to point just past that new data piece. The field that indicates to the database the length of the buffer is also updated to reflect the new buffer length (minus the length of the first piece that was already returned (32767 in this case).

[7] The application issues a FETCH CURRENT CONTINUE. The database then processes this request, ignoring non-LOB columns, and finds that there is data cached for C2 and C4. The database then writes the data to the provided buffers in the same way that it would for a normal FETCH operation, but begins at the truncation point. The application then processes the returned data in the data buffers.

In this example, the application allocated the buffer sizes for the FETCH CURRENT CONTINUE such that the remaining data will fit. However, if one of the data buffers was still too small, the database would set the truncation warnings and lengths again as described in the FETCH WITH CONTINUE step (5) above, in accordance with one or more of the variants described earlier. It may be that, for purposes of efficient processing and storage allocation, the database may want to deal with a possible trade-off between number of fetches and storage space by requiring more FETCH CURRENT CONTINUE operations. As noted, one variant would be to increase the storage allocation in constant or varying increments; another would be to set a particular maximum number of FETCH CURRENT CONTINUE operations.

Figure 2:
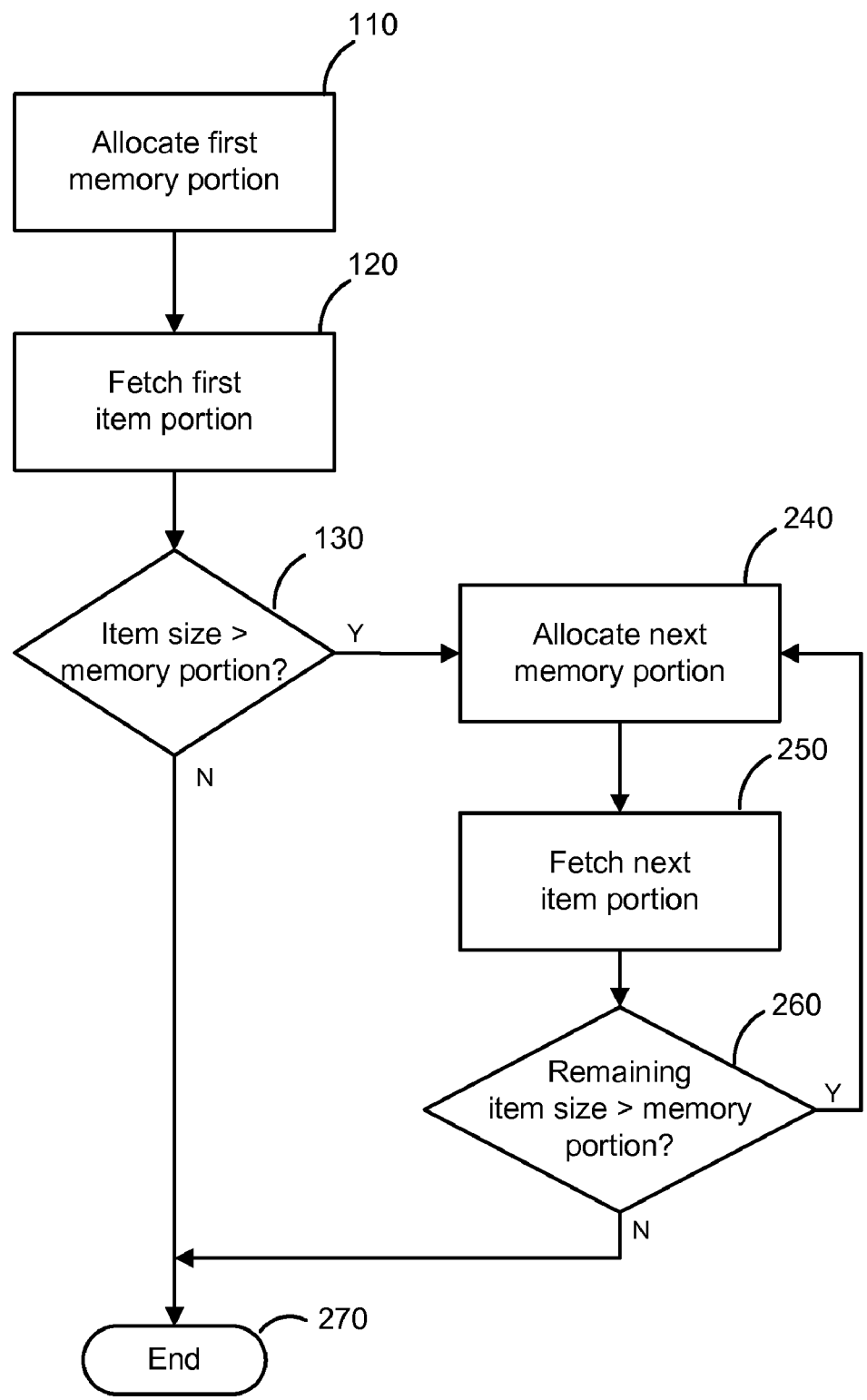
FIG. 2 is a flow chart depicting a sequence of operation for fetching a database item of indeterminate size according to another embodiment of the invention.

Examples of implementation of the approach in pseudo-code example 1 may be seen with reference to FIGS. 1 and 2. In FIG. 1, a first memory portion is allocated (110) to accommodate data retrieval. Next, a first portion of a database item is fetched (120). The item size is compared to the size of the first memory portion (130), and if it is smaller than the size of the first memory portion, the item fits within that portion, and the sequence ends. If the item is larger than the first memory portion, the next memory portion is allocated (140), and the remaining portion of the item is fetched (150).

In FIG. 2, the flow is similar to the flow in FIG. 1, except that, rather than fetching the entire remaining item if more needs to be fetched (240), a next item portion is fetched (250), and if necessary (260), there is a still further fetch.

Figure 3:
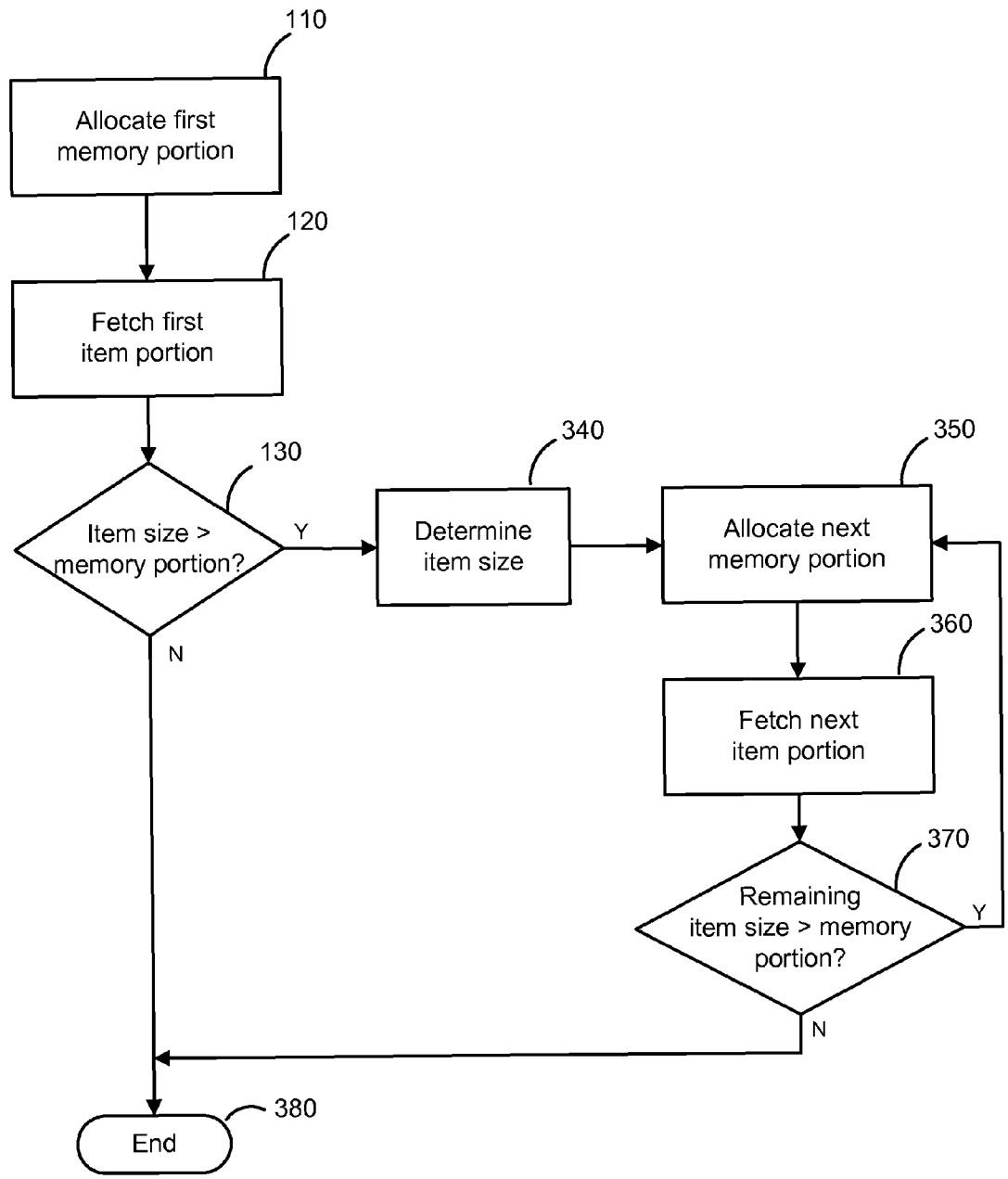
FIG. 3 is a flow chart depicting a sequence of operation for fetching a database item of indeterminate size according to a further embodiment of the invention.

In FIG. 3, the flow is similar to the flow in FIG. 2, except that the item size is determined (340) before the next memory portion is allocated (350). 360 and 370 then are similar to 250 and 260, respectively.

One variant in FIGS. 2 and 3 is that the next memory portion that is allocated (240, 350) may be the same size as the first memory portion, or may be larger (but still smaller than the remaining memory portion). If each of the next memory portions is the same size as the first memory portion, allocation is static rather than dynamic, and would fall within the following example, pseudo-code example 2.

Psuedo-Code Example 2

This example uses static SQL and direct references to host variables in the FETCH statements (no descriptor (SQLDA) manipulation). This approach is more the static SQL programming model. This example also shows the use of "streaming" the LOB data. That is, the application does not attempt to fully materialize the entire LOB or XML data items in its memory. Rather, it processes the data, one piece at a time. In this case, it writes it to a file.

In this example, the application may work with the same table shown in Example 1, but to simplify the example, it will only select one column, C2, which contains a 10 MB CLOB in a column defined with a maximum size of 100 MB. The pseudo-code for the program then might appear as follows:

```
[1] EXEC SQL BEGIN DECLARE SECTION
    DECLARE CLOBHV SQL TYPE IS CLOB(32767);
    EXEC SQL END DECLARE SECTION;
[2] EXEC SQL DECLARE CURSOR1 CURSOR FOR SELECT C2
    FROM T1;
[3] EXEC SQL OPEN CURSOR1;
[4] EXEC SQL FETCH WITH CONTINUE CURSOR1
    INTO :CLOBHV;
[5] if a row was returned
    loop until LOB is completely fetched (no truncation occurred)
        process this piece of the data - for example, write it to an
        output file if the column was truncated
            [6] EXEC SQL FETCH CURRENT CONTINUE CURSOR1
    INTO :CLOBHV;
        endif
    endloop
    endif
[7] EXEC SQL CLOSE CURSOR1;
```

The description of this pseudo-code example is as follows:

[1] The application declares a CLOB host variable that it will use to fetch the CLOB into.

[2] The application declares a cursor for a static SQL SELECT statement that will retrieve one CLOB column from the table.

[3] The application opens the cursor.

[4] The application issues the FETCH request. It uses the WITH CONTINUE clause on the FETCH to enable subsequent FETCH CURRENT CONTINUE operations. The database sees that FETCH WITH CONTINUE was specified and processes column C2 accordingly:

The amount of data written to the data buffer equals the length of the provided buffer—the length of host variable CLOBHV in this case—32767 bytes. The remaining data remains materialized (cached) at the server, and can be retrieved by the application using FETCH CURRENT CONTINUE following the current FETCH. If the data contains multi-byte characters, a partial character may result at the truncation point because the data is truncated on a byte boundary.

[5] The application checks for a successful fetch and then enters a loop in which it writes the buffer contents out to an external file. The application then checks if truncation occurred. To check each column, the application must compare the length returned by the database with the length of the buffer that it provided. If there was truncation, it executes the FETCH CURRENT CONTINUE statement to get the next piece of data. This is repeated until the LOB or XML column is completely fetched.

[6] When doing the FETCH CURRENT CONTINUE, the application uses a direct host variable reference in the INTO clause. If there had been other host variables in the original SELECT list, those would have had to have been specified in the INTO clause as well. To process the FETCH CURRENT CONTINUE statement, the database writes data to the output host variables in the same way that the initial FETCH does, but beginning at the truncation point. The database will process data for LOB or XML columns that were previously truncated. Other columns are ignored. The application processes the returned data in the data buffers.

[7] After the loop, the application closes the cursor. If there had been truncated columns with unfetched data remaining, the data would have been discarded.

One capability that this feature has is the ability to operate selectively on the truncated columns. Although the new syntax implies that the whole row can be operated on during the FETCH CONTINUE operations, it is also possible to operate on the columns selectively. This is done by providing a zero length buffer to the relational database for any of the columns that should be ignored on this FETCH operation. This can be done either on the initial FETCH WITH CONTINUE, or on any of the subsequent FETCH WITH CONTINUE requests.

Figure 4:
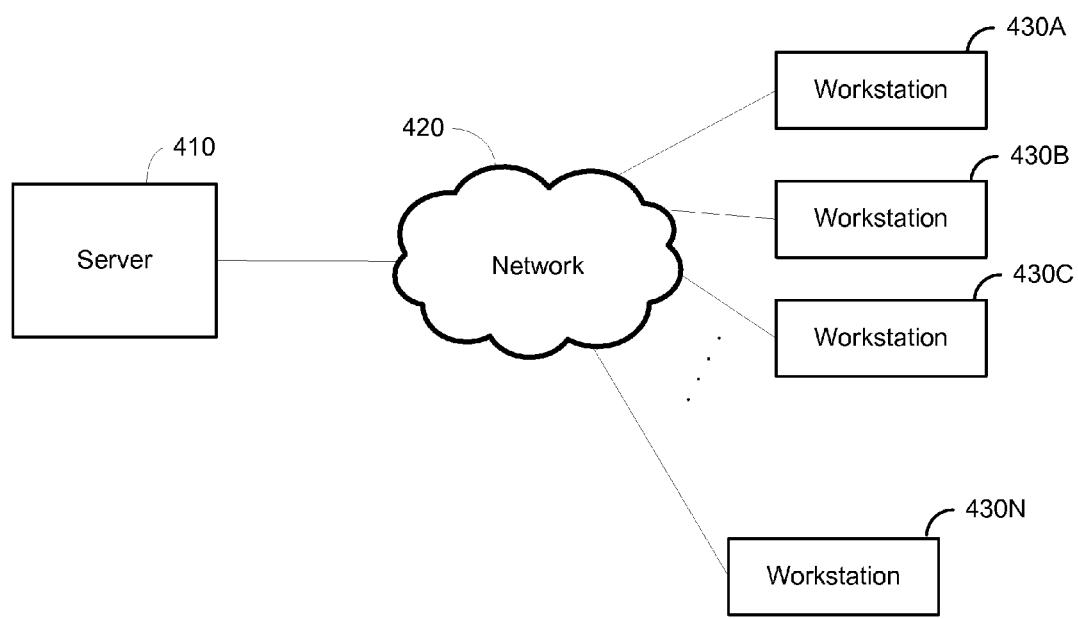
FIG. 4 is a high level block diagram depicting an overall setup of a database management system according to one embodiment of the present invention.

In FIG. 4, a server 410 is connected to one or more workstations 430A, 430B, . . . , 430N over a network 420, which may be any known network, from a local area network, to a wide area network, to the Internet, or other medium of connecting processing machines together. There may be more than one server 410, although for ease of description FIG. 4 shows a single server. The system also may include various types of network attached storage. Any of the workstations may retrieve database information from any of the servers on the network. Of course, in certain circumstances the database may be resident on a workstation.

While the invention has been described in detail above with reference to some embodiments, variations within the scope and spirit of the invention will be apparent to those of ordinary skill in the art. Thus, the invention should be considered as limited only by the scope of the following claims.

What is claimed is:

1. A method of making data available to an application program, the method comprising:
   allocating by the application program a first memory portion of a first size;
   fetching at least a first portion of an item from a database into said first memory portion, wherein said item may have an item size larger than said first size; and
   if said item size is larger than said first size,
      setting a truncation warning;
      allocating by the application program a second memory portion of a second size;
      repeating fetching a second portion of the item by a number of fetches each having the second size until all of said item has been fetched,
   wherein the number of fetches and the second size are optimized based on storage space in response to the truncation warning.

2. The method according to claim 1, further comprising repeating said allocating to allocate a memory portion of a second size equal to said first size.

3. The method according to claim 1, further comprising repeating said allocating to allocate a memory portion of a second size larger than said first size.

4. The method according to claim 1, further comprising repeating said allocating to allocate a memory portion of a second size, wherein said first size plus said second size equals said item size.

5. The method according to claim 1, wherein said database comprises rows and columns, and wherein at least one of said columns has a size larger than said first size.

6. The method according to claim 1, further comprising:
   processing said first portion of said item;
   subsequently fetching a next portion of said item; and
   repeating said processing and said subsequent fetching until all of said item has been fetched.

7. A computer program product containing program code embodied on a computer readable storage medium for performing the method of claim 1.

8. The method according to claim 1, wherein the allocating comprises dynamic storage allocation of the first size.

9. The method according to claim 1, wherein the fetching at least the first portion of the item from the database into the first memory portion is performed without using large object (LOB) locators.

10. A method of querying a database, comprising:
    fetching at least a first portion of an item from a database into a first memory portion having a first size, wherein the first size is allocated by an application program;
    if an item size exceeds said first size;
       positioning a pointer after said first portion of said item;
       subsequently issuing a second command to fetch a next portion of said item after said pointer into a second memory portion;
       setting a truncation warning;
       allocating by the application program a second memory portion of a second size; and
       repeating fetching a second portion of the item by a number of fetches each having the second size until all of said item has been fetched,
    wherein the number of fetches and the second size are optimized based on storage space in response to the truncation warning.

11. The method according to claim 10, further comprising returning a value that indicates said item size.

12. The method according to claim 10, wherein said second memory portion is the same size as said first memory portion.

13. The method according to claim 10, wherein said second memory portion is larger than said first memory portion.

14. The method according to claim 10, further comprising, if said first size exceeds said item size, positioning said pointer after said next portion and repeating said fetching until all of said item has been fetched.

15. The method according to claim 10, wherein said database comprises rows and columns of data, and wherein at least one of said columns has a size larger than said first size.

16. A computer program product containing program code embodied on a computer readable storage medium for performing the method of claim 10.

17. A database system comprising:
    a processing system, accessible by one or more workstations, containing a database and memory;
    first program code for allocating by an application program a first memory portion having a first size and fetching at least a first portion of an item from the database into said first memory portion, wherein said item may have an item size larger than said first size; and
    second program code for, if said item size is larger than said first size, repeating said fetching until all of said item has been fetched; and
    if said item size is larger than said first size,
       setting a truncation warning;
       allocating by the application program a second memory portion of a second size;
       repeating fetching a second portion of the item by a number of fetches each having the second size until all of said item has been fetched,
    wherein the number of fetches and the second size are optimized based on storage space in response to the truncation warning.

18. The system according to claim 17, wherein said second program code allocates a memory portion that is the same size as said first memory portion.

19. The system according to claim 17, wherein said second program code allocates a memory portion that is larger than said first memory portion.

20. The system according to claim 17, wherein said database comprises rows and columns of data, and wherein at least one of said columns has a size larger than said first size.

21. The system according to claim 17, wherein said second program code processes said first portion of said item; fetches and processes next portions of said item until all of said item has been fetched and processed.

22. The system according to claim 17, wherein the processing system comprises one of the workstations.

* * * * *